US008958223B2

(12) United States Patent
Mariadassou et al.

(10) Patent No.: US 8,958,223 B2
(45) Date of Patent: Feb. 17, 2015

(54) COMPACT HIGH-POWER DIODE/THYRISTOR RECTIFIER ARCHITECTURE

(75) Inventors: Prithu Mariadassou, Paris (FR); Joel Devautour, Le Pecq (FR)

(73) Assignee: Alstom Technology Ltd, Baden (CH)

( * ) Notice: Subject to any disclaimer, the term of this patent is extended or adjusted under 35 U.S.C. 154(b) by 84 days.

(21) Appl. No.: 13/884,545

(22) PCT Filed: Nov. 7, 2011

(86) PCT No.: PCT/EP2011/069557
§ 371 (c)(1),
(2), (4) Date: Jul. 22, 2013

(87) PCT Pub. No.: WO2012/062707
PCT Pub. Date: May 18, 2012

(65) Prior Publication Data
US 2013/0301320 A1 Nov. 14, 2013

(30) Foreign Application Priority Data
Nov. 10, 2010 (FR) ...................... 10 59313

(51) Int. Cl.
H02M 7/06 (2006.01)
H02M 7/08 (2006.01)
H02M 7/00 (2006.01)

(52) U.S. Cl.
CPC ................ *H02M 7/08* (2013.01); *H02M 7/003* (2013.01)
USPC ........................................................ 363/126

(58) Field of Classification Search
USPC .................... 363/70, 125–126, 144
See application file for complete search history.

(56) References Cited

U.S. PATENT DOCUMENTS

| | | | | | |
|---|---|---|---|---|---|
| 3,173,061 | A | * | 3/1965 | Storsand | 361/699 |
| 3,624,488 | A | * | 11/1971 | Rabut | 363/64 |
| 4,015,184 | A | * | 3/1977 | Cooperman | 363/141 |
| 4,079,305 | A | * | 3/1978 | Peterson et al. | 363/27 |
| 4,188,659 | A | * | 2/1980 | Cailloux | 363/37 |

(Continued)

FOREIGN PATENT DOCUMENTS

GB          1 245 741 A        9/1971

OTHER PUBLICATIONS

French Preliminary Search Report for French Application No. 1059313, dated Jul. 19, 2011.
Wiestner, Max et al., "100 kA Conversion Units for highly efficient Aluminium Smelters," Reprint from Aluminium Mar. 2004, ABB Switzerland Ltd Brochure, 6 pages, Jan. 11, 2005.

(Continued)

*Primary Examiner* — Timothy J Dole
*Assistant Examiner* — Yusef Ahmed
(74) *Attorney, Agent, or Firm* — Nixon Peabody LLP

(57) ABSTRACT

A Graëtz-bridge converter-rectifier in which at least one rectifier arm situated between a single AC terminal and a single DC terminal includes multiple unidirectional electronic components connected in parallel and connected on one side to the DC terminal by means of a conductive component set and on the other side to the AC terminal. The invention is characterized in that the component set for at least one rectifier arm includes a plurality of separate component busbars each having at least one end connected to the DC terminal, the unidirectional components being divided between the component busbars into as many component sets connected in parallel as there are component busbars.

12 Claims, 6 Drawing Sheets

(56) References Cited

U.S. PATENT DOCUMENTS

| | | | |
|---|---|---|---|
| 5,132,896 A * | 7/1992 | Nishizawa et al. | 363/144 |
| 5,331,537 A * | 7/1994 | Skarpetowski | 363/138 |
| 5,376,768 A * | 12/1994 | Pasquini et al. | 219/121.57 |
| 5,393,954 A * | 2/1995 | Pasquini et al. | 219/121.52 |
| 5,463,653 A * | 10/1995 | Du Parc et al. | 373/108 |
| 6,188,555 B1 * | 2/2001 | Mitlehner et al. | 361/84 |
| 8,482,904 B2 * | 7/2013 | Darroman et al. | 361/624 |
| 2002/0041504 A1 * | 4/2002 | Steinke | 363/65 |
| 2007/0247027 A1 * | 10/2007 | Kauranen | 310/330 |
| 2010/0014338 A1 * | 1/2010 | Jacobson et al. | 363/141 |
| 2012/0093193 A1 * | 4/2012 | Desroques et al. | 374/136 |
| 2013/0278368 A1 * | 10/2013 | Tirilly et al. | 336/5 |

OTHER PUBLICATIONS

Peeran, Syed M., "Current Balance in Parallel Power Diodes in Three-Phase Rectifiers", IEEE Transactions on Industry Applications, IEEE Service Center, Piscataway, NJ, US, vol. IA-23, No. 3 (May/Jun. 1987).

Schanen, Jean-Luc, "Impact of the Physical Layout of High-Current Rectifiers on Current Division and Magnetic Field Using PEEC Method", IEEE Transactions on Industry Applications, IEEE Service Center, Piscataway, NJ, US, vol. 46, No. 2 (Mar./Apr. 2010).

International Search Report, PCT/EP2011/069557, dated Jul. 27, 2012.

* cited by examiner

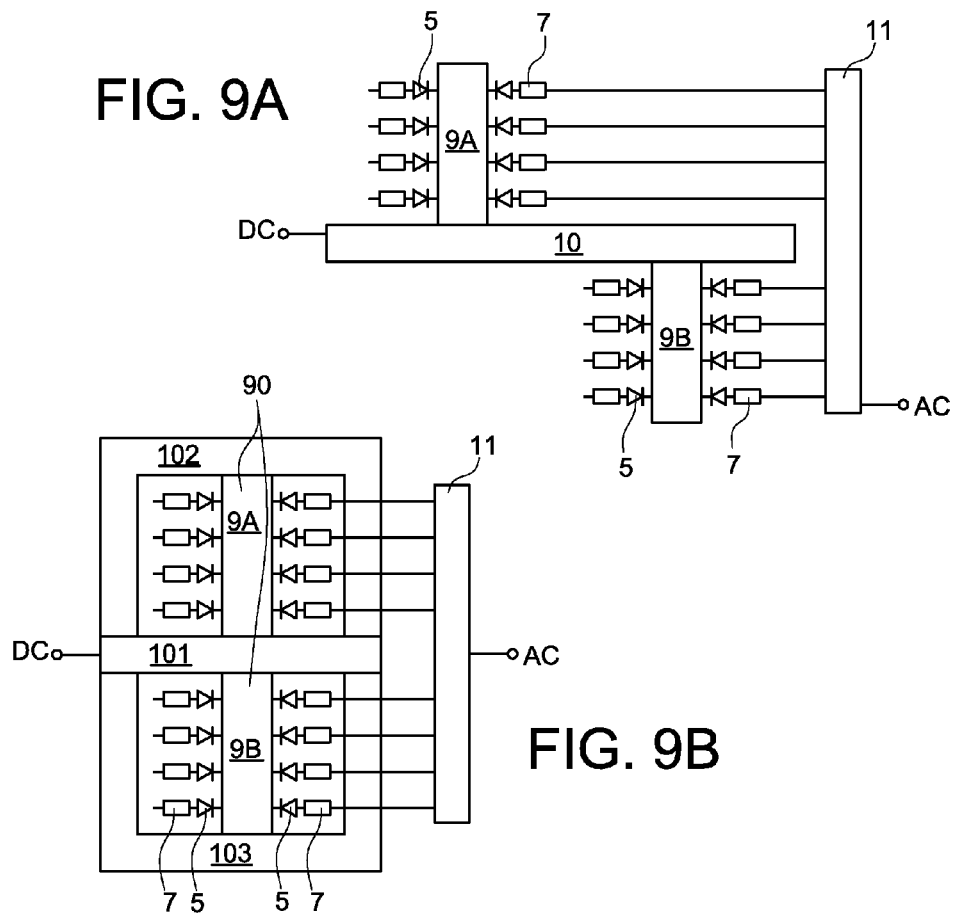
FIG. 9A
FIG. 9B
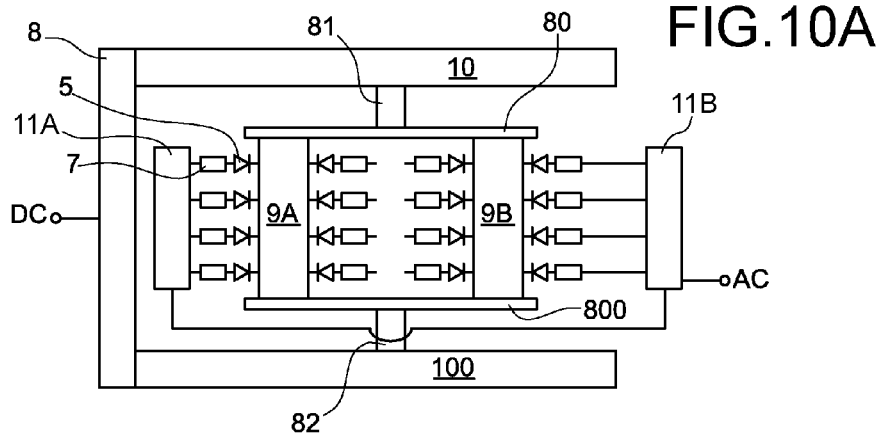
FIG. 10A

COMPACT HIGH-POWER DIODE/THYRISTOR RECTIFIER ARCHITECTURE

CROSS REFERENCE TO RELATED APPLICATIONS or PRIORITY CLAIM

This application is a National Phase of PCT/EP2011/069557, filed Nov. 7, 2011, entitled, "COMPACT DIODE/THYRISTOR RECTIFIER ARCHITECTURE ALLOWING HIGH POWER", which claims the benefit of French Patent Application No. 10 59313, filed Nov. 10, 2010, the contents of which are incorporated herein by reference in their entirety.

TECHNICAL FIELD

The present invention relates to the field of high-current and/or high- or medium-voltage power rectifiers.

This field covers rectifiers able to deliver direct currents up to 110 kiloamps (kA) and direct current (DC) voltages that may exceed 2200 volts (V).

The invention relates to the architecture of high-power (100 megavoltamp (MVA)) rectifiers used for feeding direct current to electro-intensive processes requiring high-power DC power supplies. Thus the invention may be used to supply power to aluminum or non-ferrous metal (copper, zinc, chlorine) electrolysis plants. The invention may also be used to supply power to other electro-intensive processes requiring high-power DC power supplies such as direct current arc furnaces.

In the description below the use of such rectifiers for supplying power to an electrolysis plant is used as one particular example.

DESCRIPTION OF THE PRIOR ART

An electrical power supply for an electrolysis plant consists of a plurality of power supply sources, usually called groups, connected in parallel. FIG. 1 shows the theory of operation of a power supply group. This power supply group consists primarily of:

a regulating transformer 1 for adjusting a grid voltage to an intermediate voltage;

a transformer called a rectifier transformer 2 for adjusting the intermediate voltage to an appropriate off-load voltage depending on the value of the load voltage induced by the plant to be supplied with power and for delivering the high currents necessary for the electrolysis process;

a rectifier 3 using semiconductor components (diodes or thyristors) for delivering a rectified DC current and voltage to the load; and a set of power busbars 4 for connecting the power supply groups in parallel.

FIG. 2 shows one example of a twelve-phase double Graëtz-bridge diode rectifier 3. This rectifier converter combines two Graëtz-bridge structures R1 and R2, each connected to a transformer among a first three-phase transformer T1 and a second three-phase transformer T2. Each three-phase transformer T1, T2 has three phases, namely phases U1, V1, W1 for the first three-phase transformer T1 and U2, V2, W2 for the second three-phase transformer T2. Each three-phase transformer feeds a three-phase Graëz bridge. Each three-phase Graëz bridge functions as a single-phase Graëz bridge having three terminals fed with alternating current, called AC terminals, and two terminals delivering a direct current. A three-phase Graëz bridge makes it possible to produce a current having a period of one-sixth of an initial period of the three-phase transformer. Each phase U1, V1, W1 and U2, V2, W2 is connected to the Graëz bridge by one of the above-mentioned AC terminals. For simplicity the AC terminals and the phases have the same references.

In FIG. 1, to simplify the diagram, the two AC terminals of the same phase are represented as connected together.

The two three-phase Graëz bridges are connected at two common DC terminals, namely a positive DC terminal DC+ and a negative DC terminal DC−. These DC terminals make it possible to deliver a DC current and voltage to the plant to be supplied with power.

Each Graëz bridge (R1, R2) includes six arms called rectifier arms U1+, U1−, V1+, V1−, W1+, W1−, U2+, U2−, V2+, V2−, W2+, W2− arranged to connect each phase U1, V1, W1 and U2, V2, W2 to each of the two DC terminals (DC+, DC−). Accordingly, each rectifier arm of a Graëz bridge is connected between an AC terminal and a DC terminal.

Each rectifier arm U1+, U1−, V1+, V1−, W1+, W1−, U2+, U2−, V2+, V2−, W2+, W2− is itself formed by connecting in parallel n unidirectional electronic components 5, for example diodes or thyristors. The unidirectional electronic components are so called because they allow current to pass in only one direction and block current in the opposite direction. Below the expression "unidirectional component 5" refers interchangeably to a diode, a thyristor or some other unidirectional electronic component.

The aim of this parallel connection of components is to obtain an element functioning as a diode whilst having a sufficiently high rating to rectify the power passing through the rectifier 3. The n unidirectional components 5 are conventionally electrically connected on one side to the same conductive structure, called a component busbar 6, which makes it possible to transmit current between the unidirectional components 5 and the DC terminal.

Each unidirectional component 5 is preferably connected on the other side in series with a fuse resistor, called a fuse 7. The fuses are used to break a fault current flowing in a faulty unidirectional component 5, thereby protecting the rectifier arm. Such a faulty unidirectional component passes current in the opposite direction to that normally allowed by the unidirectional component 5. This would limit the benefit of the rectifier arm. If only one unidirectional component is faulty a current flows in the opposite direction in said faulty unidirectional component and in the fuse adjoining it at a power corresponding to the full power of the transformer. This power destroys the fuse 7, which breaks the electrical connection via the faulty unidirectional component 5. This breaks the current flowing in the opposite direction. The faulty unidirectional component 5 is taken out of circuit and, even though a fault has occurred, a functional rectifier arm is obtained having one fewer unidirectional component 5.

To increase the power circulating in the rectifier 3 it is necessary to increase the voltage or the current.

If the value of the rectified voltage is increased (typically to 2200 volts DC (Vdc) it is necessary to use diodes or thyristors 5 able to withstand a high reverse voltage. However, current electronic component technology does not make it possible to produce high-current diodes or thyristors 5. As described above, it is necessary to use multiple unidirectional components 5 connected in parallel. To increase the rectified current, it is also necessary to increase the number of unidirectional components 5 connected in parallel. Thus for a 100 kA 2200 Vdc rectifier it is necessary to connect between 18 and 20 diodes or thyristors in parallel in each rectifier arm, depending on the type of electronic component used and the operating conditions.

Moreover, it is very difficult to obtain fuses 7 with a very high current rating if the rectified voltage is increased. This limits the current that may flow in each fuse 7. It is then necessary to limit the current in each unidirectional component 5 and this leads to an increase in the number of [component+fuse] functional groups connected in parallel.

Such parallel connection of the components gives rise to problems of balancing the current between the unidirectional components 5 of the same rectifier arm. FIG. 3 gives an example of the current distribution for a typical rectifier arm including n diodes.

An order number assigned to each of the diodes in a rectifier arm starting from one end of a component busbar is plotted on the abscissa axis. The current I carried by each diode is plotted on the ordinate axis.

It is seen that one of the diodes is less loaded than the others and carries a current Imin and that at least one other diode is more loaded than the others and carries a current Imax. An average current Imoy is given by the total current in the rectifier arm divided by the number n of unidirectional components 5 in parallel.

It can be seen that the end diodes, located at the ends of the component busbars, are the most current loaded. It can be explained by the geometry of the circuit but also by the distribution of the magnetic field, as explained below in reference to FIG. 7.

An imbalance (disequilibrium) percentage d % is defined by the following formula:

$$d\% = \text{Max}(I\text{max}/I\text{moy}-1\|I\text{min}/I\text{moy}-1|).$$

Because of this imbalance between the least loaded and most loaded diodes of the rectifier arm, it is necessary to rate all the components of a rectifier arm to withstand a current Imax even though few components really need to carry such currents.

FIG. 4 gives a few typical values of imbalance d % obtained in existing structures as a function of the number n of diodes present on the component busbar of the rectifier arm. The value of d % depends primarily on the mechanical structure of the rectifier.

It is seen that the value of imbalance d % increases very rapidly with the number n of components in parallel. This induces very high variations of current from one diode to another.

To rectify a high power, it is necessary to add unidirectional components 5 in parallel. This increases the imbalance. Consequently, the average current Imoy passing through the unidirectional component 5 decreases. It becomes necessary to add further unidirectional components 5 in parallel in order to compensate the reduced value of Imoy, which further accentuates the imbalance.

Finally, beyond a certain current value, existing rectifier structures have a number n of unidirectional components 5 to be connected in parallel that leads to a prohibitive imbalance.

Users of this type of rectifier 3 frequently impose a maximum value of imbalance d % that is not to be exceeded in the rectifiers. This imbalance criterion is an equipment acceptance criterion.

To be able to propose equipment capable of delivering high powers, it becomes necessary to create rectifier architectures allowing in each rectifier arm the parallel connection of a large number n of diodes or thyristors at the same time as there being a limited imbalance, typically 30%.

In prior art parallel connections the unidirectional components 5 of a rectifier arm are generally connected to the DC terminal via an aluminum or copper frame 8 (see FIG. 5). In the current state of the art there are various ways to produce this frame 8, the objective being to balance the distribution of impedances between the unidirectional components 5 and the DC terminal. FIG. 5 shows the structure of a double Graëz bridge in which each Graëz bridge rectifies three phases U1, V1, W1 and U2, V2, W2 supplied with alternating current. The double Graëz bridge delivers a direct current at its output, via two DC terminals DC+ and DC−.

The unidirectional components 5 of a rectifier arm are connected on one side to a water-cooled aluminum or copper conductive busbar 9 usually called a component busbar. The current I flowing in the rectifier arms is collected by one or more conductive busbars 10 called collector busbars forming part of the above-mentioned frame 8 and perpendicular to the component busbars 9. Each end of a component busbar 9 is connected to a collector busbar 10. The collector busbars 10 then form two opposite sides of the frame 8 and connect the component busbars 9 to a DC terminal (DC+ or DC−) of the rectifier.

A fuse resistor 7 is connected to one side of each unidirectional component 5, the unidirectional component 5 being in series between the fuse resistor 7 and the collector busbar 10. The fuse resistors 7 are carried by a conductive busbar, called a fuse busbar 11, in copper or aluminum, water-cooled. There is one fuse busbar 11 for each rectifier arm. The fuse busbar 11 connects the unidirectional components 5 via the fuse resistors 7 to a corresponding AC terminal of the rectifier. A unidirectional component 5 and the associated fuse resistor 7 form a functional group.

Accordingly, starting from an AC terminal U1, V1, W1, U2, V2, W2, a current passing through a rectifier arm G therefore passes through:
- a conductive cable 12;
- a fuse busbar 11 (the current in which is divided between the functional groups);
- a fuse 7;
- a unidirectional component (diode or thyristor) 5 in series with the fuse 7;
- a component busbar 9 (in which the currents from the different functional groups are combined).

The current then leaves the rectifier arm and reaches the collector busbars 10 of the frame 8 and is combined with current from the other phases (U1, V1, W1, U2, V2, W2) before joining a DC terminal to which the frame 8 is connected.

The component busbars 9 and the fuse busbars 11 have a plurality of faces. The unidirectional components 5 and the fuses 7 are generally connected to two opposite faces of the component busbars 9 and the fuse busbars 11 (see FIG. 6). FIG. 6 is a perspective diagram illustrating this principle. There are seen therein a fuse busbar 11 connected by one end to an AC terminal and a component busbar 9 connected by one end to a collector busbar 10. Finally there are represented multiple functional groups 60 each including a fuse 7 in series with a unidirectional component 5. The functional groups 60 are not positioned directly between the fuse busbar 11 and the component busbar 9. Such a position would clutter the space between the two busbars 9, 11.

To declutter the structure, the functional groups 60 are separated into two sets connected to the two busbars 9, 10 on the two sides of a plane P passing through the two busbars.

At present there are commercially available rectifiers including up to 14 diodes or thyristors in parallel in each rectifier arm.

It is also known from the prior art to provide at least one intermediate busbar 13 known as the commutation busbar the advantages of which are described as allowing better equilibrium in the ABB document "100 kA conversion units for highly efficient aluminum smelters", reprint from Aluminum 2004/3, p4. The intermediate busbar 13 is positioned at the level of the frame 8 connected to the DC terminal. It connects two collector busbars each situated at one end of a component busbar. The intermediate busbar is situated between two component busbars and thus added to conductive busbars that are situated at the ends of the collector busbars.

The author of the above document indicates a value of imbalance d % greater than 22% for a number n of diodes or thyristors equal to 14.

The above prior art structures are unsatisfactory because it is hardly possible to go beyond 16 or 18 components in parallel without the imbalance becoming prohibitive.

It is therefore clear that, to enable conversion of currents or voltages at high powers, it is important to be able to increase the number of functional groups in parallel. However, by the same token, it is important to limit the magnitude of the imbalance.

SUMMARY OF THE INVENTION

Here the invention relates mainly to the architecture of the rectifier and aims to make it possible to connect a large number of components in parallel without exceeding the maximum imbalance value imposed by users. The invention typically aims to connect in parallel 20, 24 or more components with a maximum imbalance between 20% and 30%.

The invention proposes to create for each phase at least two sets of functional groups in parallel. From a mechanical point of view, this consists in duplicating each component busbar and each fuse busbar so that there are at least two component busbars and two fuse busbars connected in parallel.

The objective of the proposed new architecture is to address the problem of increasing the power to be delivered by the rectifier.

Thus the invention provides a Graëz-bridge converter-rectifier including terminals fed with alternating current, called AC terminals, and two terminals adapted to feed an exterior circuit with direct current, called DC terminals, and rectifier arms connecting each AC terminal to each DC terminal. Each rectifier arm is situated between a single AC terminal and a single DC terminal and includes multiple unidirectional electronic components, called unidirectional components, connected in parallel. The unidirectional components are connected on one side to the DC terminal by means of a conductive set, called a conductive set, and on the other side to the AC terminal.

The invention is characterized in that the component set for at least one rectifier arm includes a plurality of conductive busbars, called component busbars, each having at least one end connected to the DC terminal. The unidirectional components are connected to the component busbars and divided between them into as many component sets connected in parallel as there are component busbars. It is therefore clear that there are at least two component busbars for each rectifier arm.

Thus according to the invention the imbalance is confined to each component group. A rectifier of the invention thus includes at least two sets of components each having an imbalance associated with n unidirectional components. Each component set may thus be balanced independently of the other component sets. It is then necessary to obtain an overall balance between the two sets of components.

Such an arrangement reduces the total imbalance of the rectifier arm with two component busbars compared to a prior art rectifier arm having 2n unidirectional components. According to the invention, each component busbar includes only n unidirectional components. The imbalance to be corrected for each component busbar is then of the order of the imbalance associated with n unidirectional components instead of the imbalance associated with 2n unidirectional components. It is clear that if there are more than two component busbars the imbalance in each component busbar is reduced commensurately compared to a prior art construction.

In the situation of the parallel connection of a larger number of components, for example 20 components, to two component busbars, the invention makes it possible to reduce the imbalance by a factor close to 2.

Simulations that have been carried out yielded the following results:

prior art with n=20: 50% imbalance;
invention with n=20: 20 to 25% imbalance.

A converter-rectifier of the invention performs better than a prior art converter-rectifier because replacing a single component busbar by a plurality of component busbars introduces an additional degree of maneuver for balancing. By creating for each phase of the rectifier transformer a number k of sets of n/k unidirectional components in parallel, with k at least equal to 2, the balancing problem is reduced from balancing the n components of each phase with one another, to balancing firstly each of the k sets of n/k components independently of the others, and to balancing secondly the k sets with one other.

A converter-rectifier of the invention is moreover much more compact in terms of volume than current prior art solutions and this is because the component busbar and the fuse busbar have a length divided by 2, 3 or 4 or more compared to the prior art.

Thus the invention makes it possible to rectify greater powers than in the prior art without thereby introducing too much imbalance.

The invention also relates to a rectifier arm wherein the connection between the unidirectional components and the AC terminal is effected by a fuse set. The fuse set includes a fuse resistor, called a fuse, for each unidirectional component connected on one side in series with said unidirectional component and on the other side to at least one fuse busbar connected to the AC terminal. In other words, the fuse set includes at least one fuse busbar and fuse resistors adapted to behave as fuses. The fuses are connected in parallel with each other so that each unidirectional component is in series with a fuse specific to it, forming a functional group. The functional groups are in parallel with each other in the same way that the unidirectional components are in parallel with each other.

According to the invention, the rectifier arm includes a plurality of separate component busbars. There may be two, three, four or more component busbars, for example, and the more separate component busbars there are, the greater the number of unidirectional components that may be grouped in parallel whilst retaining a low imbalance for each component busbar. The additional difficulty of having to balance the component busbars with each other must nevertheless be taken into account. The components assigned to the same component busbar are preferably connected to the same fuse busbar.

A rectifier arm of the invention may be such that the fuse set includes at least one fuse busbar for each component busbar. Each fuse busbar is electrically connected to the components assigned to a single component busbar. The fuse busbars are connected together by a conductive busbar called a distribution busbar. This makes it possible to have a better resistance distribution between the functional groups of a rectifier arm.

The unidirectional components of each component busbar are advantageously divided into two groups each positioned on an opposite side of the component busbar. As in the prior art, this arrangement makes it possible to reduce the structural differences between the unidirectional components and to reduce the imbalance.

A Graëz-bridge converter-rectifier that includes a collector busbar preferably connects the DC terminal to separate component busbars connected to a plurality of AC terminals. In other words, the collector busbar of a DC terminal connects the DC terminal to the rectifier arms coming from the various AC terminals. The collector busbar is preferably fixed to one end of the component busbars.

There may be a plurality of collector busbars each connected to one end of at least one component busbar and assembled together to form a frame connected to the DC terminal. This makes it possible to transport the current between the unidirectional components and the DC terminal more efficiently. There are more conduction paths between the DC terminal and each unidirectional component.

In one embodiment of the invention, the separate component busbars are situated on the same side of the collector busbar.

Conversely, the component busbars are situated on either side of a collector busbar called a central collector busbar, they are connected by one end to said collector bus bar. In this case, two component busbars are shifted with respect to one another at their binding to the collector busbar.

Advantageously, the component busbars are electrically connected with each other, by one end, to the same connecting busbar, said connecting busbar being connected to a collector busbar via a conductor. The conductor spaces the collector busbar from the connecting busbar. To improve the imbalance of the components, it is preferable that the conductor is connected, substantially, in the middle of the connecting busbar.

To improve the compactness of the converter-rectifier, it is preferable that the component busbars are located substantially in the same plane and that the conductor and the collector busbar to which it is connected are disposed substantially in the same other plane, the two planes being substantially perpendicular.

When the invention relates to a multi-phase Graëz-bridge converter-rectifier, each transformer is connected by AC terminals to a Graëz bridge specific to it. Moreover, the Graëz bridges of the various transformers each have a positive DC terminal and a negative DC terminal connected to a circuit to be fed with direct current, the Graëz bridges have their positive DC terminals commoned and their negative DC terminals commoned. If the transformers are three-phase transformers the Graëz bridges are three-phase Graëz bridges.

BRIEF DESCRIPTION OF THE DRAWINGS

The invention can be more clearly understood and other details, advantages and features of the invention become apparent on reading the following description given by way of non-limiting example and with reference to the appended drawings, in which:

FIGS. 9A and 9B show in simplified form, the structure of the rectifier arms at the level of the component busbars and the fuse busbars according to another embodiment of the invention;

FIGS. 10A and 10B show in a simplified form, the structure of the rectifier arms at the level of the component busbars and the fuse busbars, according to the invention, wherein the component busbars are connected with each other, via a connecting busbar fixed to a collector busbar, the collector busbar being spaced from the connecting busbar;

Identical, similar or equivalent parts of the various figures carry the same reference numbers to facilitate moving from one figure to another.

To simplify the figures the various parts represented in the figures are not necessarily represented to a uniform scale.

The figures showing various embodiments of the device of the invention are provided by way of example and are not limiting on the invention.

DETAILED DESCRIPTION OF PARTICULAR EMBODIMENTS

The invention relates firstly to a three-phase Graëz-bridge rectifier arm designed to be included in a converter-rectifier. The rectifier arm is described below as such or as if included in the converter-rectifier. Generally speaking, FIGS. 7 to 12, illustrating the invention, are diagrams of a single rectifier arm of the invention and not of the converter-rectifier as a whole.

Figure 1:
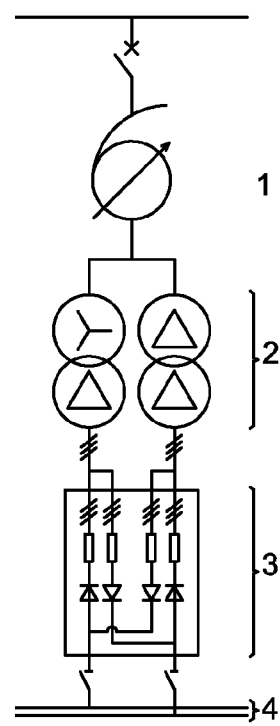
FIG. 1 (prior art) is a simplified electrical circuit diagram of a plant DC power supply architecture.
Figure 2:
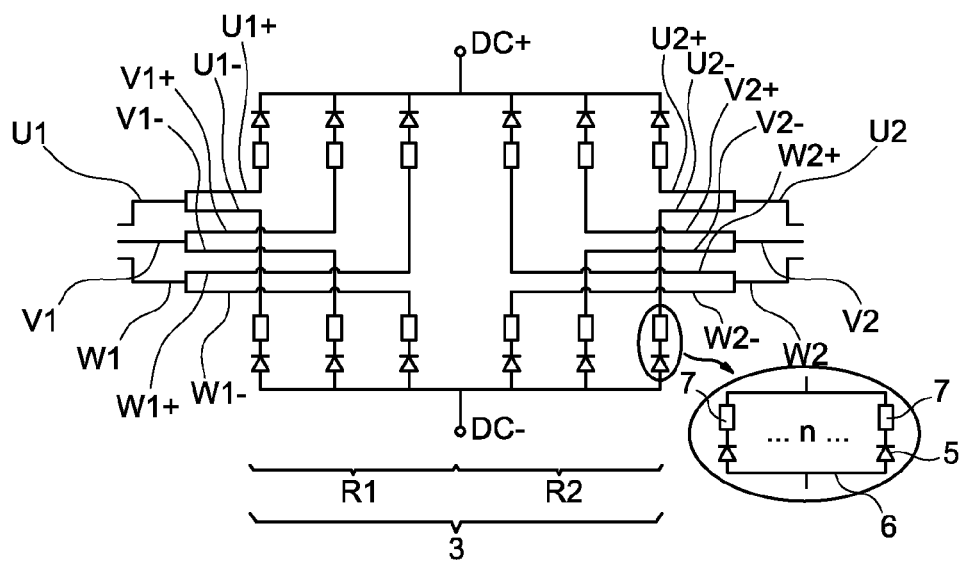
FIG. 2 (prior art) is an electrical circuit diagram of a Graëz-bridge rectifier including at the input three phases fed with alternating current.
Figure 3:
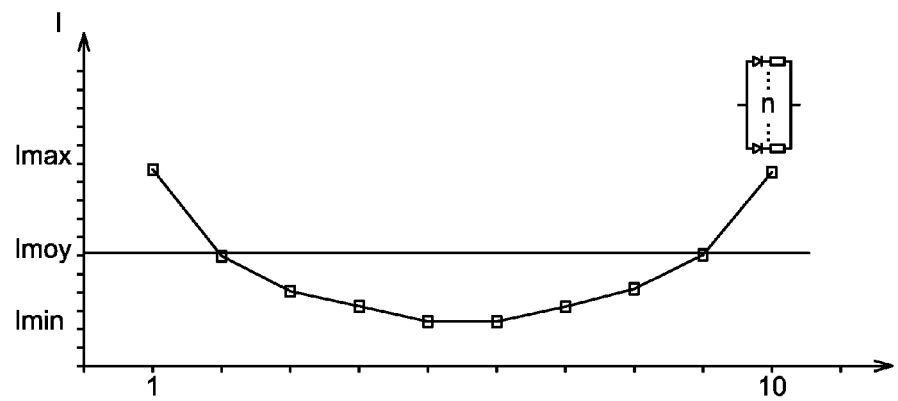
FIG. 3 (prior art) is a graph representing the current passing through a component as a function of its position on a component busbar.
Figure 4:
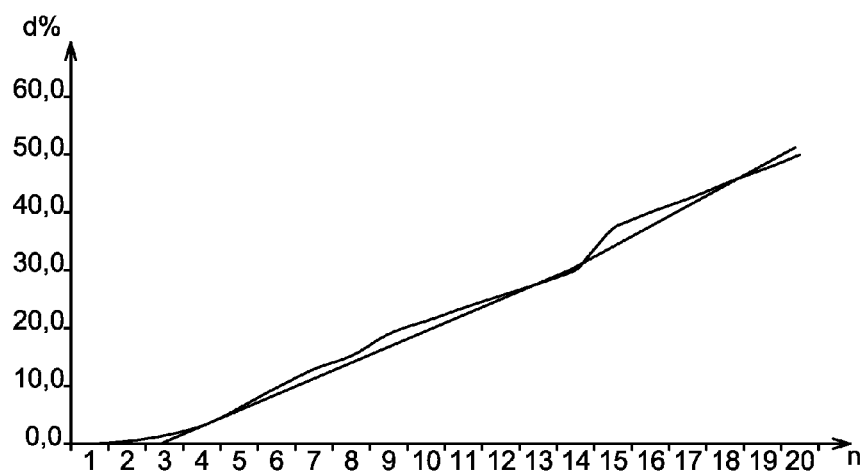
FIG. 4 (prior art) is a graph illustrating the evolution of the imbalance between the components as a function of the number of components present on the same component busbar.

As shown in FIG. 2, a three-phase Graëz-bridge rectifier R1, R2 is formed of six rectifier arms connecting each of two AC terminals of each of the three phases U1, V1, W1 or U2, V2, W2 fed with alternating current to two DC terminals of an electrical circuit to be fed with direct current. The three-phase Graëz bridge therefore has a positive DC terminal DC+, seen with a positive polarity by the electrical circuit, and a negative DC terminal DC−, seen with a negative polarity by the electrical circuit. Each phase U1, V1, W1, U2, V2, W2 includes two rectifier arms U1+, U1−, V1+, V1−, W1+, W1−, U2+, U2−, V2+, V2−, W2+, W2−, G2 connecting an AC terminal of one phase and one of the two DC terminals.

Each rectifier arm U1+, U1−, V1+, V1−, W1+, W1−, U2+, U2−, V2+, V2−, W2+, W2− includes a set of electronic components that allow current to pass in only one direction. These components are referred to as unidirectional components. The rectifier arms U1+, U1−, V1+, V1−, W1+, W1−, U2+, U2−, V2+, V2−, W2+, W2− are arranged so that their conjugation produces a direct current at the DC terminals from an alternating current fed to the AC terminals.

The set of unidirectional electronic components of a rectifier arm includes in particular a given number n of diodes or thyristors connected in parallel. In the remainder of the description, the expression "unidirectional component 5" refers interchangeably to a diode, a thyristor or some other unidirectional electronic component.

Figure 7:
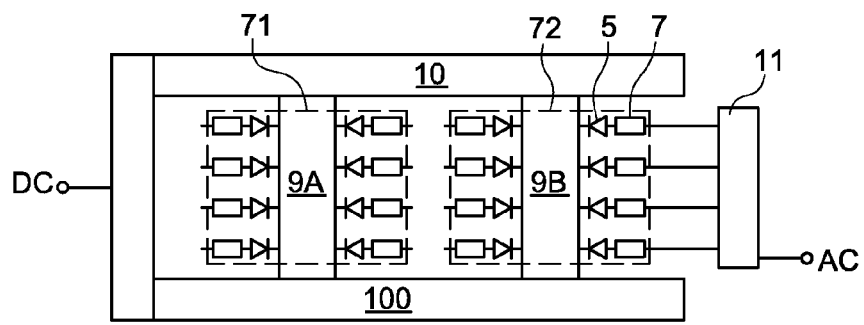
FIG. 7 shows in a simplified manner the structure of the rectifier arms at the level of the component busbars and the fuse busbars and the arrangement of the component busbars relative to the collector busbars in a first embodiment of the invention.
Figure 8:
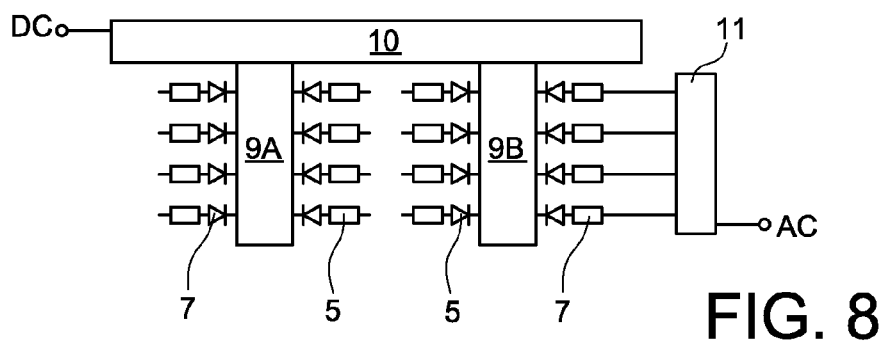
FIG. 8 is a variant of FIG. 7 with only one collector busbar.

To limit the imbalance that occurs when many unidirectional components 5 are connected in parallel to the same component busbar 9, the invention proposes to use for each rectifier arm U1+, U1−, V1+, V1−, W1+, W1−, U2+, U2−, V2+, V2−, W2+, W2− at least two component busbars 9A, 9B instead of only one (see FIG. 7). Distributing the unidirectional components 5 between two component busbars 9A, 9B instead of one, halves the number of unidirectional components 5 to be balanced for each component busbar 9A, 9B. It is then easy to balance the component busbars 9A, 9B with each other.

Each component busbar 9A, 9B may have one end connected to a collector busbar 10 and the other end connected to another collector busbar 100, the two collector busbars 10, 100 being connected to each other and to the same DC terminal.

According to the invention, each collector busbar 10, 100 is then connected to at least two component busbars 9A, 9B of said rectifier arm. In other words, of the unidirectional components 5 connected in parallel in the same rectifier arm some are connected to a given component busbar 9A and others to another, separate component busbar 9B, thus forming at least two sets of components 71, 72. The two component busbars 9A, 9B are themselves connected to one or more collector busbars 10, 100 so that the sets of components 71, 72 are connected in parallel with each other.

Figure 5:
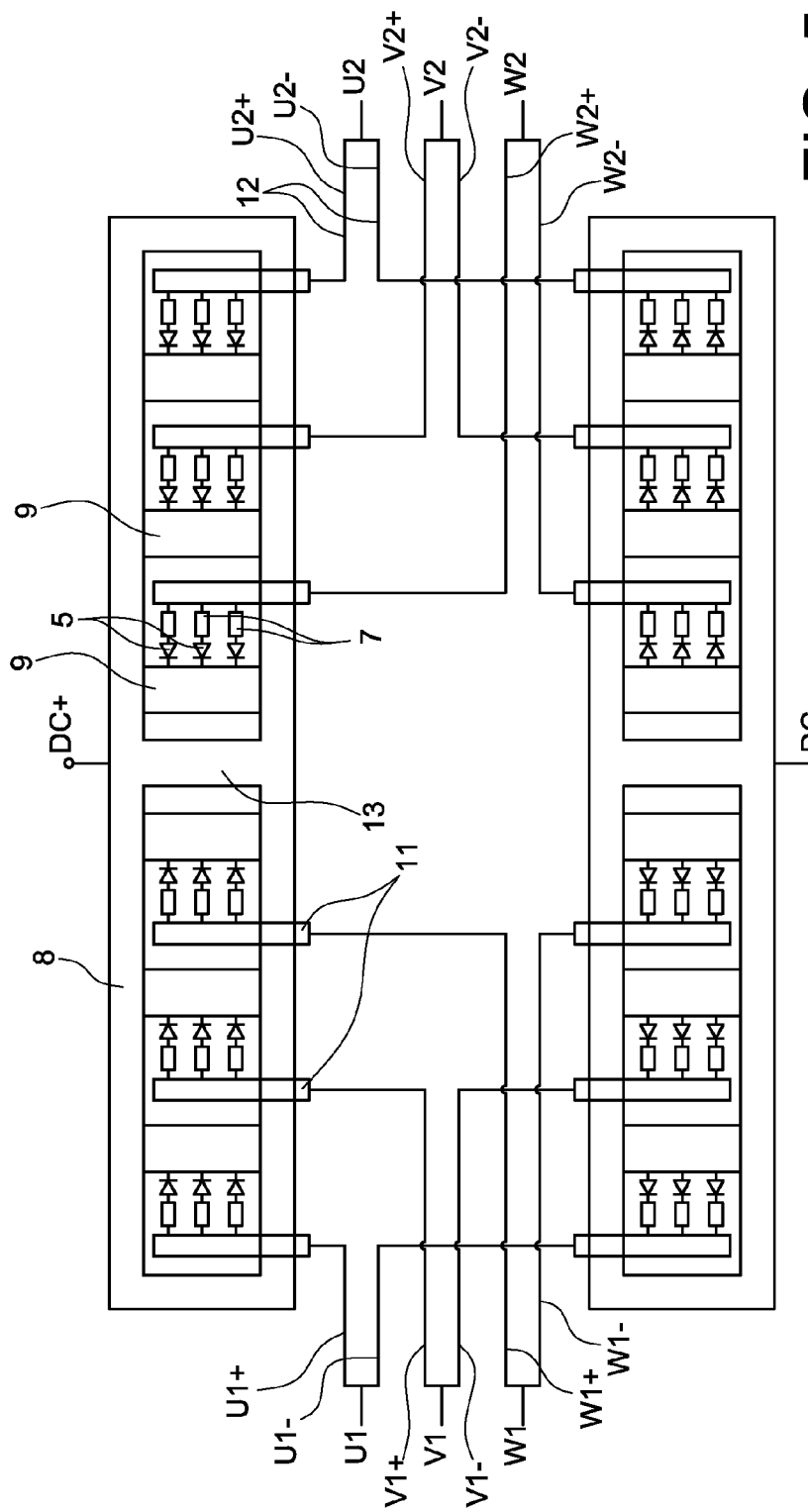
FIG. 5 (prior art) shows a Graëz-bridge rectifier representing in simplified form the structure of the rectifier arms at the level of the component busbars and the fuse busbars.

The collector busbars 10, 100 are generally common to the three rectifier arms of the same three-phase Graëz bridge connecting the AC terminals of the same transformer to the same DC terminal. They are also generally common to the rectifier arms of various transformers, in the case of a multi-transformer converter-rectifier, for example as shown in FIG. 5 which represents a twelve-phase converter with two three-phase Graëz bridges connected in parallel.

FIG. 7 shows the fuse busbar 11 and the fuses 7 connected to the unidirectional components 5. Although only the fuses 7 on the right-hand side of the figure are represented as connected to the fuse busbar 11, it is to be understood that all the fuses 7 are connected to the fuse busbar 11, and that this applies to all subsequent figures.

From an electrical point of view, the unidirectional components 5 are arranged in the same way relative to each other as in the prior art. However, from a structural point of view, the unidirectional components 5 are not attached to a single component busbar connected to one or more collector busbars 10, 100 at its ends, but to at least two independent component busbars 9A, 9B electrically connected by at least one of their ends to one or more collector busbars 10, 100.

In one embodiment, as shown in FIG. 7, the collector busbars 10, 100 may form a frame 8 around the component busbars 9A, 9B. The frame may have only three sides as in FIGS. 7, 10, 12 or four sides as in FIG. 9B. The collector busbars 10, 100 are fixed to the two ends of each of the component busbars 9A, 9B and are connected to each other. In a variant (FIG. 8), the component busbars 9A, 9B may be positioned on the same side of a single collector busbar 10. One end of each component busbar 9A, 9B is connected to a collector busbar 10 and its other end may be free or connected to a second collector busbar 100.

In the configuration of FIG. 7, the current flowing through the collector busbars 10, 100 have the same polarity, thus the magnetic field in the vicinity of the unidirectional components 5 located at the ends of the component busbars 9A, 9B is more intense than the magnetic field at the level of the median unidirectional components 5. The extreme unidirectional components 5 are more current loaded than the median unidirectional components 5.

In another embodiment, the component busbars 9A, 9B may be situated on either side of a central collector busbar 101 (FIG. 9A). The two component busbars 9A, 9B are separate and offset relative to each other at their connection to the central collector busbar. In some circumstances (FIG. 9B), two component busbars 9A, 9B may be assembled with a central collector busbar 101. The two component busbars 9A, 9B are thus in line with each other. Furthermore, additional collector busbars 102, 103 are provided at the other extremities of component busbars 9A, 9B, not fixed at the central collector busbar 101. Said additional collector busbars 102, 103 are then connected to the central collector busbar 101 so as to form a frame 8 around the component busbars 9A, 9B. This enables the component busbars 9A, 9B to evacuate all the current transmitted from the unidirectional components (diodes or thyristors) 5 via two ends instead of only one end, the two ends of the component busbars 9A, 9B being connected to a collector busbar 101, 102, 103.

Figure 10B:
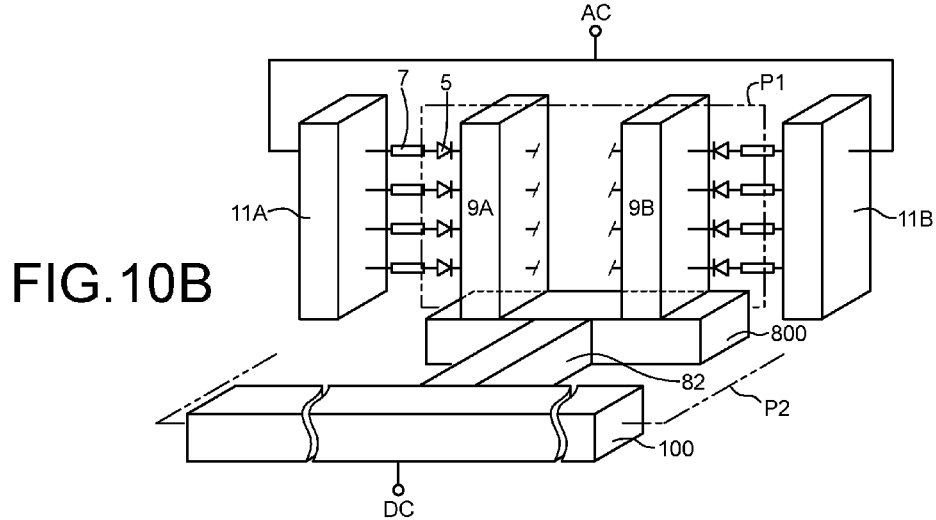

In a further embodiment, shown in FIGS. 10A and 10B, the component busbars 9A, 9B of the same rectifier arm may be connected together at one or both ends by a conductive busbar 80, 800 called a connecting busbar. The connecting busbars 80, 800 differ from the collector busbars in that they are specific to only one rectifier arm. Moreover, they do not pass a current from another phase or passing via an AC terminal other than that to which the rectifier arm is connected, unlike the collector busbars 10, 100. The component busbars 9A, 9B are separate.

The connecting busbars 80, 800 are each connected by a single conductor 81, 82 to a single collector busbar 10, 100. If there are two connecting busbars 80, 800, they are connected to two different collector busbars 10, 100 that are themselves connected to each other and to the DC terminal. In both cases, each collector busbar 10, 100 is spaced from the connecting busbar 80, 800 to which it is connected. This space is due to the presence of the conductor 81, 82 located crosswise which moves them away from each other. The collector busbars 10, 100 and the connecting busbars 80, 800 are substantially parallel. A conductor 81, 82 is substantially parallel to the collector busbar and to the connecting busbar which connects. An advantage of the space is that it allows to obtain a good compactness. The conductors 81, 82 may take the form of conductor busbars also called space busbars.

As illustrated in FIG. 10B, the component busbars 9A, 9B extend in the same plane P1. A collector busbar 10 and the associated conductor 81 extend in another same plane P2, both planes P1, P2 being substantially perpendicular. FIG. 10B is a partial view, it shows only collector busbar 100, conductor 82 and connecting busbar 800. The other collector busbar 10, the other connecting busbar 80 and the conductor 81 are omitted so as not to overload the figure. In the same purpose, FIG. 10B shows, for each component set, only a part of the components and not all.

There is, preferably, a conductor 81, 82 substantially in the middle of the connecting busbar 80, 800 to which it is fixed.

Thanks to the presence of the spaced connecting busbars, spaced busbars and collector busbars arranged as disclosed in FIGS. 10A, 10B, the magnetic field is less intense than in the configuration of FIG. 7, by example, in which the component busbars are directly connected to the collector busbars. Consequently, the unidirectional components are less current loaded, it leaves to an improved balance of the unidirectional components connected to the same component busbar. The magnetic field at a substantially central area of the connecting busbars is locally low, this is due to currents of opposite polarity in the connecting busbar.

This embodiment makes it possible for any current reaching a DC terminal from a given AC terminal to pass through the same impedance caused by the collector busbar 10, 100 regardless of the component busbar 9A, 9B it passes through. In other embodiments, if the DC terminal is situated to the right or to the left of the component busbars 9A, 9B, one of the component busbars 9A is closer to the DC terminal than the other component busbar 9B (see FIG. 7). In the embodiment shown in FIGS. 10A and 10B, whether the current arrives via the unidirectional components 5 connected to one of the component busbars 9A or via the unidirectional components 5 connected to another component busbar 9B, the current sees the same impedance caused by the connecting busbars 80, 800, the frame 8 including the collector busbars 10, 100 and the conductors 81, 82.

Figure 11:
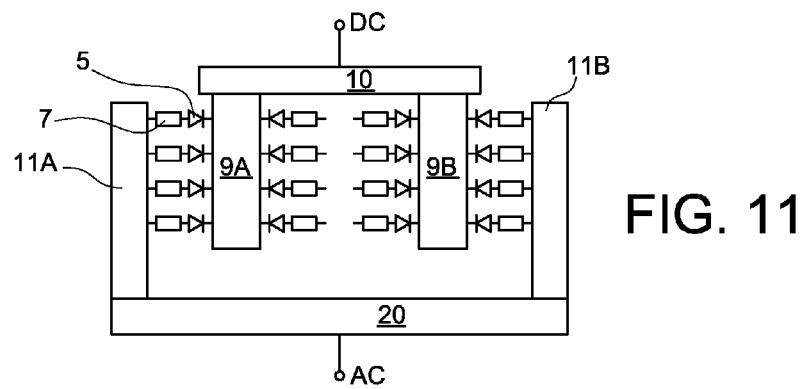
FIG. 11 shows a third embodiment of the invention in which there are as many fuse busbars 11A, 11B as component busbars.

Finally, in a final embodiment shown in FIG. 11, a plurality of fuse busbars 11A, 11B make it possible to connect to the AC terminal the [unidirectional component 5+fuse 7] functional groups. There are at least as many fuse busbars 11A, 11B as there are component busbars 9A, 9B so that the unidirectional components 5 electrically connected to the same component busbar 9A, 9B are connected to the AC terminal via the same fuse busbar 11A, 11B and vice-versa. A conductive busbar called a distribution busbar 20 connects the AC terminal to the fusible busbars 9A, 9B. This embodiment makes it possible to avoid a front/rear imbalance.

An electrical connections set, called an electrical connection, connects the fuse busbar to a fuse, said fuse to a unidirectional component, and said unidirectional component to the component busbar. This electrical connection defines a connection resistance for a functional group.

Figure 6:
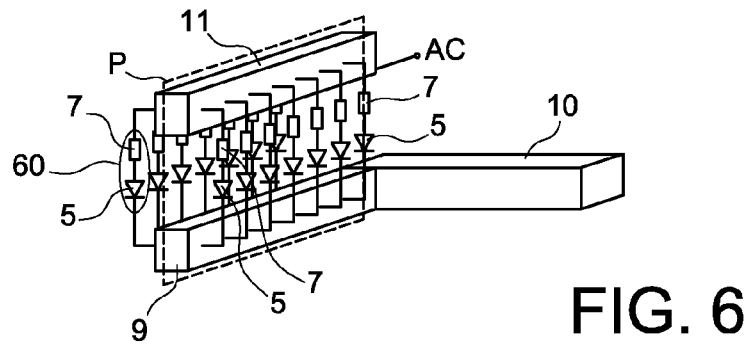
FIG. 6 is a perspective view of an arrangement of functional groups relative to a component busbar, a fuse busbar, and a collector busbar.

The presence of multiple component busbars 9A, 9B separates the unidirectional components 5 into multiple component sets. As described above, in relation to FIG. 7, the presence of the component busbars 9A, 9B forms component sets 71, 72 (see FIG. 7). Moreover, in each component set, it is generally possible to define two groups of unidirectional components 5, namely a first group of unidirectional components 5 connected to one side of the component busbar 9A, 9B and a second group of unidirectional components 5 connected to an opposite side of the component busbar 9A, 9B, as shown in FIG. 6. These groups are referred to as busbar sets.

Generally speaking, the electrical connections have substantially the same resistance within the same component set, respectively within the same busbar set. However, for structural reasons, it may happen that the electrical connections are different from one component set, respectively busbar set, to another. This leads to variations of the connection resistance between the AC terminal and the component busbar according to whether the current passes through a given component set, respectively busbar set, or another given component set, respectively busbar set.

Thus a front-back imbalance appears if the electrical connections of one component set, respectively busbar set, have a different connection resistance to another component set, respectively busbar set.

In FIG. 11, it is clear that each fuse busbar 11A, 11B is connected to all the functional groups of a component busbar 9A, 9B although, for reasons of simplification, a connection is shown only with the outermost fuses in the diagram.

The embodiment shown in FIG. 11 provides as far as possible one fuse busbar 11A, 11B for each set of components liable to have a different connection resistance than another group. By providing one fuse busbar for each component busbar, the electrical connections are smaller and there is therefore a lower risk of forming different connection resistances. If, for structural reasons, the busbar sets have different connection resistances, the embodiment shown in FIG. 11 may be generalized. It is then necessary to provide a connecting busbar 11A, 11B for each busbar set instead of providing only one connecting busbar 11A, 11B for each component busbar 9A, 9B.

Figure 12:
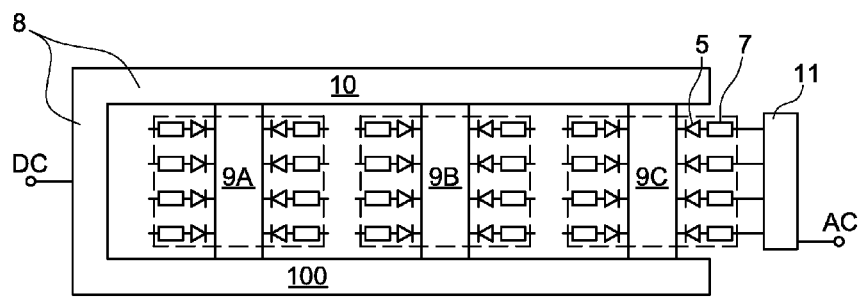
FIG. 12 shows an embodiment of the invention including more than two component busbars.

Finally, as shown in FIG. 12, it is possible to use the principle of the invention to provide more than two component busbars. This figure represents three component busbars 9A, 9B, 9C.

The invention has been illustrated by means of a converter-rectifier with two three-phase Graëz bridges, referred to as a twelve-phase converter-rectifier. The invention relating to the arrangement of the unidirectional components within a rectifier arm, it is obvious that the invention relates equally to an adaptation of the given examples to converter-rectifiers with n three-phase Graëz bridges, where n is greater than or equal to 1, or to a single-phase Graëz bridge.

The invention claimed is:

1. A Graëtz-bridge converter-rectifier comprising a plurality of terminals called AC terminals, fed with alternating current, and two terminals called DC terminals, adapted to feed an exterior circuit with direct current, rectifier arms (U1+, U1−, V1+, V1−, W1+, W1−, U2+, U2−, V2+, V2−, W2+, W2−) connecting each AC terminal to each DC terminal, a rectifier arm being situated between a single AC terminal and a single DC terminal, and multiple unidirectional electronic components, called unidirectional components, connected in parallel and connected on one side to the DC terminal by means of a conductive component set, called component set, and on the other side to the AC terminal;

wherein the component set for at least one rectifier arm (U1+, U1−, V1+, V1−, W1+, W1−, U2+, U2−, V2+, V2−, W2+, W2−) including a plurality of separate conductive component busbars, called component busbars, each having at least one end connected to the DC terminal, the unidirectional components being connected to the component busbars and divided into as many component sets connected in parallel as there are component busbars; characterized in that the component busbars of a same rectifier arm are connected to the same connecting busbar, each connecting busbar being connected by a single conductor to a single collector busbar, the conductor, spacing the connecting busbar from the collector busbar; and, wherein the connection between the unidirectional components and the AC terminal is effected by a fuse set, that includes a fuse resistor, called fuse, for each unidirectional component connected on one side in series with said unidirectional component and on the other side to at least one fuse busbar connected to the AC terminal.

2. A Graëtz-bridge converter-rectifier according to claim 1, wherein the components assigned to the same component busbar are connected to the same fuse busbar.

3. A Graëtz-bridge converter-rectifier according to claim 2, wherein the fuse set includes at least one fuse busbar for each component busbar, each fuse busbar being electrically connected to the components assigned to a single component busbar.

4. A Graëtz-bridge converter-rectifier according to claim 1, wherein the fuse set includes at least one fuse busbar for each component busbar, each fuse busbar being electrically connected to the components assigned to a single component busbar.

5. A Graëtz-bridge converter-rectifier according to claim 4, wherein several fuse busbars are connected with each other by a conductive busbar called distribution busbar.

6. A Graëtz-bridge converter-rectifier according to claim 1, wherein for each component busbar, the components are divided into two groups, each positioned on an opposite side of the component busbar.

7. A Graëtz-bridge converter-rectifier according to claim 1, wherein the collector busbar is fixed to one end of the component busbars.

8. A Graëtz-bridge converter-rectifier according to claim 1, wherein the separate component busbars are situated on a same side of a collector busbar.

9. A Graëtz-bridge converter-rectifier according to claim 1, wherein the separate component busbars are situated on either side of a central collector busbar.

10. A Graëtz-bridge converter-rectifier according to claim 1, wherein the conductor is connected to the connecting busbar substantially in the middle of the connecting busbar.

11. A Graëtz-bridge converter-rectifier according to claim 1, wherein the component busbars are located substantially in a same plane (P1), the conductor and the collector busbar to which it is connected, are disposed substantially in a same other plane (P2), the two planes (P1, P2) being substantially perpendicular.

12. A multi-phase Graëtz-bridge converter-rectifier according to claim 1, further comprising two transformers each connected by AC terminals (U1+, U1−, V1+, V1−, W1+, W1−, U2+, U2−, V2+, V2−, W2+, W2−) to a Graëtz bridge (R1, R2) specific to it, the Graëtz bridges (R1, R2) each having a positive DC terminal and a negative DC terminal connected to a direct current power supply circuit, the Graëtz bridges (R1, R2) having their positive DC terminals commoned and their negative DC terminals commoned.

* * * * *